Jan. 12, 1954  E. W. ALLARDT  2,666,121
ROTARY SEAM WELDING TRANSFORMER
Filed Jan. 2, 1951  2 Sheets-Sheet 1

INVENTOR
Ernst W. Allardt
BY
ATTORNEY

Jan. 12, 1954  E. W. ALLARDT  2,666,121
ROTARY SEAM WELDING TRANSFORMER
Filed Jan. 2, 1951
2 Sheets-Sheet 2

INVENTOR
Ernst W. Allardt
BY
ATTORNEY

UNITED STATES PATENT OFFICE 2,666,121

ROTARY SEAM WELDING TRANSFORMER

Ernst W. Allardt, Alliance, Ohio, assignor, by mesne assignments, to The Babcock & Wilcox Company, Jersey City, N. J., a corporation of New Jersey Application January 2, 1951, Serial No. 204,029

5 Claims. (Cl. 219—6)

This invention relates to resistance welding apparatus, and more particularly to a novel mounting for the welding electrodes of a rotary welding transformer for resistance welding longitudinal seams, for example, in the manufacture of welded tubing.

In the manufacture of such tubing, an elongated strip of skelp is fed through a series of forming rolls which progressively shape the strip into the form of a tube having an open slit extending longitudinally thereof. The thus formed tubing is then progressively fed into operative relationship with a pair of welding electrodes, each of which engage the tubing an opposite sides of the abutting edges of the seam. A relatively heavy current is passed from one electrode to the other electrode through the abutted edges of the tube, these edges being forced into engagement under pressure by suitable squeeze rolls. The heat created by the resistance to the flow of electric current across the abutted tube edges forms a resistance weld closing the tube.

Various arrangements have been proposed and tried for conducting the relatively heavy electric currents to the rotating welding electrodes. Such arrangements include rotary welding transformers in which the electrodes are secured as a unit to the transformer, or commutator means for conducting current from a stationary transformer to the rotating electrodes.

One of the difficulties encountered with rotatable transformers has been the provision and maintenance of proper relative adjustment of the electrodes in accordance with the desired width of weld. The present invention is directed to a novel rotary welding transformer in which the electrodes are mounted on tapered mounting surfaces on the outer end of a tubular single turn secondary winding. The inner and outer electrodes are bolted together, with a dielectric disk therebetween, to form an electrode unit which is then mounted on the tapered mounting surfaces. The dielectric disk is so chosen as to provide the desired electrical insulation between the electrodes. A nut threaded on the outer end of the tubular secondary forces the electrode unit into firm seating engagement on the mounting surfaces.

For a clearer understanding of the invention principles, references is made to the following description of a typical embodiment thereof as illustrated in the accompanying drawings.

In the drawings:

Figs. 5 and 6 are sectional views on the correspondingly numbered lines of Fig. 2.

Figure 1:
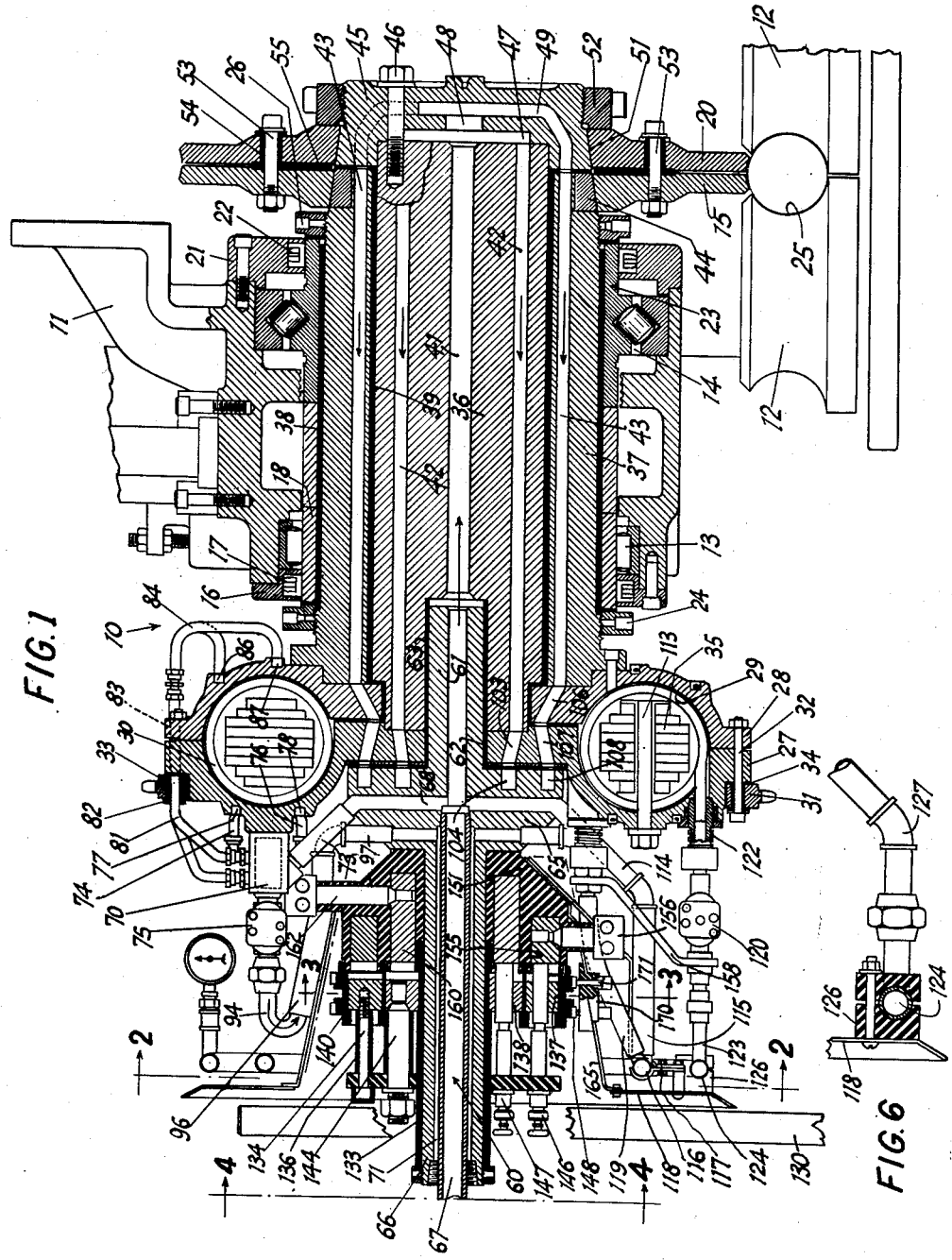
Fig. 1 is an axial sectional view through a rotary seam welding transformer embodying the invention.

Referring to Fig. 1, a rotary welding transformer generally indicated at 10 is rotatably supported in a relatively sturdy bracket 11, with the disk welding electrodes 15 and 20 centered relative to a tube 25 fed between squeeze rolls 12, 12. The transformer is supported in bracket 11 by an inner roller bearing assembly 13 and an outer roller and thrust bearing assembly 14. A ring 16 on the inner side of bracket 11 supports a sealing ring 17 in engagement with the inner race 18 of bearing assembly 13. A similar ring 21 secured to the outer face of bracket 11 maintains a sealing ring 22 in operative relation with the inner race 23 of bearing assembly 14. The bearing assemblies 13 and 14 are maintained in proper position on the transformer by inner and outer end rings 24 and 26 threaded on the transformer 10. The rings or nuts 24, 26 are also used to align the center of the electrodes with the center of the squeeze rolls.

In the particular rotary welding transformer illustrated, the secondary winding comprises a pair of complementary housing sections 27 and 28 of electrically conductive material, which are secured together to form a housing enclosing a toroidal cavity 29 in which are mounted the primary winding 30 and the transformer magnetic core 35. Section 27 has a circumferential recess in which is seated a sprocket gear 31 secured to the section by bolts 32 which unite the two housing sections, insulating sleeves 33 surrounding bolts 32 within gear 31. The insulation of gear 31 from section 27 is provided by insulation 34 seated in the recess in section 27.

Secondary housing section 27 is secured, in electrically conductive relation, to an inner cylindrical member 36, and section 28 is secured to a cylindrical conductive member 37 telescoped over member 36. An insulating sleeve 38 is disposed between the outer surface of member 37 and the bearing assemblies, and insulation 39 is disposed between the two cylindrical members and between the inner periphery of section 28 and member 36. For a purpose to be described, member 36 has an axial passage 41 and longitudinally extending passages 42 formed therethrough. Similarly, cylindrical member 37 has longitudinally extending passages 43 formed therethrough.

In accordance with the invention principles, the outer end of member 36 has a recess thereon receiving a trapazoidal bearing ring 44 having its outer surface sloping at a relatively small angle to the axis of the transformer. This bearing ring serves as a seat for the inner electrode 15. The seat for the outer electrode is formed by a cap 45 which is bolted by studs 46 to the inner cylindrical member 36. Cap 45 has passages 47 interconnecting passage 41 and passages 42. The cap also has a central bore 48, and passages 49 extending therefrom, the bore 48 and passages 49 inter-connecting passage 41 and passages 43.

The inner portion of the outer surface of cap 45 is sloped, as at 51, so that the surface portion 51 forms a continuation of the outer surface of ring 44. These two surfaces conjointly provide a tapered seat mounting for electrodes 15 and 20, with electrode 20 seated on surface 51. A clamping ring 52 is threaded on the outer end of cap 45 and serves to force the electrodes 15 and 20 into firm engagement with their tapered seating surfaces.

The electrodes are interconnected by bolt and nut arrangements 53, insulating sleeves 54 electrically insulating electrode 20 from bolts 53. An insulating disk 55 is disposed between the adjacent electrode surfaces, and the thickness of this disk is selected to provide the desired electrical insulation of the welding electrodes.

Circulation of coolant to the transformer elements may be effected through the medium of a manifold generally indicated at 60. This manifold includes an inner tubular extension 61 fitting in an axial recess 62 in the end of member 36, and extending through the casing section 27. Insulation 63 insulates extension 61 from member 36 and casing section 27, the manifold being held to the transformer by suitable studs 64.

Manifold 60 has an annular enlarged portion 65 seated against casing section 27 (Fig. 5), and an outer tubular extension 66. A tube or pipe 67 is seated within extension 66, providing a pair of concentric passages therein. The inner end of member 67 terminates adjacent radial passages 68 in enlargement 65, and the annular passage 71 formed between extension 66 and member 67 communicates, at its inner end, with radial passages 72 in enlargement 65. The member 67 forms the inlet for the coolant, whereas passage 71 forms the outlet therefore. Through the medium of suitable coupling means, such as a rotating union (not shown), the inlet and outlet communicate with a suitable coolant circulating system of the required capacity.

The cooling circuit for the secondary may be traced as follows. Coolant entering through member 67 flows into radial passages 68, and through insulating sleeves 73 into a dual inlet and outlet manifold 70. From manifold 70, the coolant flows through nipples 74 and 76 into interrupted annular tubes 77 and 78 seated in recesses 79 (Fig. 5) in casing section 27, each nipple being connected to one end of its corresponding interrupted annular tube. Also from the inlet section of manifold 70 coolant flows through connections 81, 81 secured in insulating nipples 82 in the ring gear 31. Nipples 82 communicate with passages 83 extending longitudinally through the casing sections and connected, by conduits 84, 84, to interrupted annular tubes 86, 87 seated in recesses in casing section 28.

The opposite ends of tubes 77 and 78 are connected by fittings 91, 92 to the outlet section of manifold 70. Similarly, an arrangement similar to the inlet connections, and including conduits 93, 93, connects tubes 86 and 87 to the outlet section of manifold 70. From such outlet section, the coolant flows through a thermostat 75 into a conduit 94, and through an insulating sleeve 96 and a connection 97 into radial passages 72, from which the coolant exits through passage 71.

Figure 2:
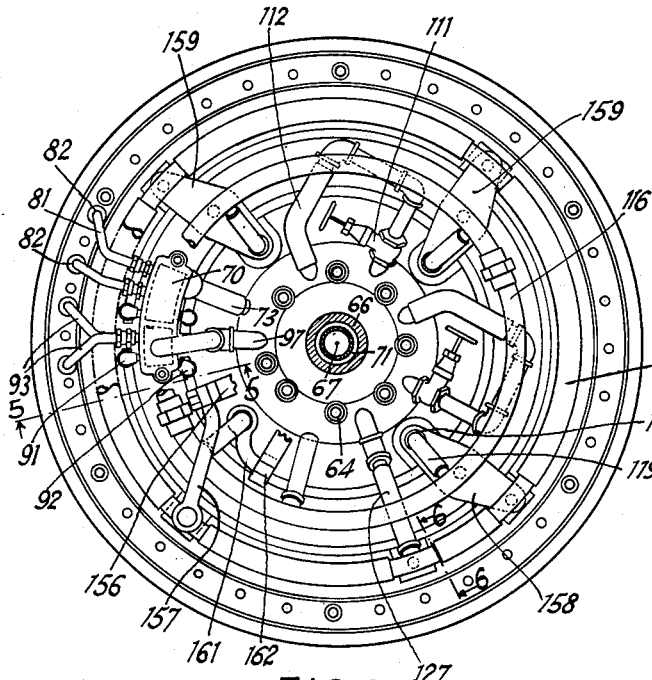
Figs. 2, 3 and 4 are diametrical sectional views on the correspondingly numbered lines of Fig. 1.
Figure 5:
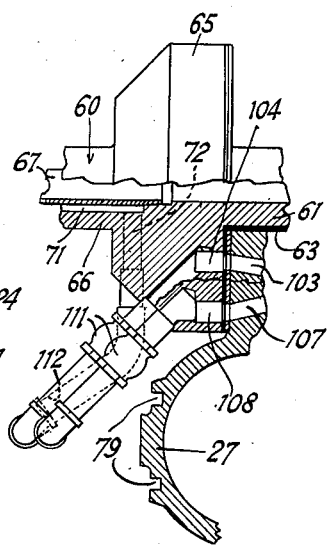

From member 67, the inflowing coolant goes through extension 61 and passage 41 in member 36 to passages 47, 48 and 49 in cap 45. The coolant returns from cap 45 through longitudinal passages 42 in member 36 communicating with passage 47, and longitudinal passages 43 in member 37 communicating with passage 49. The inner ends of passages 42 are aligned with passages 103 in casing section 27 which communicate with an annular passage 104 in the inner face of enlargement 65 as best seen in Fig. 5. Similarly, passages 43 communicate through passage 106 in section 28 and passage 107 in section 27 with an annular passage 108 (Fig. 5) in the inner face of enlargement 65. Referring to Figs. 1 and 2, connections including a valve 111 and an insulating sleeve 112 connect annular passages 104 and 108 to passage 71, from which the coolant exits as described.

The primary winding 30 is mounted, for example, in insulated relation within the toroidal cavity formed by casing sections 27 and 28. The particular primary winding illustrated includes four (4) sections, each extending for substantially one-quarter of the length of the secondary casing sections. Each section includes a toroidal tubular copper coil embracing the magnet core 35. The latter is secured in the casing sections by bolted brackets 113. The electrical circuit connections of the primary winding will be described more fully hereinafter.

Circulation of coolant through the primary winding is effected in the following manner. A connection 114 and an insulating sleeve 115 connect passages 68 to an annular tubular manifold 116 supported in brackets 117 on a shield 118 rotatable with transformer 10. From manifold 116, 4 connections, each including an insulating sleeve 119, conduct coolant to insulating nipples 121 each connected to one end of a primary coil section. The opposite end of each coil section is connected to a nipple 122 which in turn is connected to a thermostat 120. Thermostat 120 is connected, by a connection 123, to an outer annular tubular manifold 124 supported in a bracket 126 on shield 118. A connection 127, as best seen in Figs. 1, 2 and 6, interconnects manifold 124 and one of the outlet passages 72, for return flow of the coolant. The brackets 126 are made of insulating material. Thus, the coolant is delivered to inlet manifold 116 from which it flows, in parallel, through the four (4) primary coil sections, and from the opposite end of each section to the outlet manifold 124 for delivery, through connection 127, to an outlet passage 72.

The current supply to the primary winding includes a commutator arrangement having stationary brushes engaging commutator rings rotatable with the transformer assembly. The control circuits for the thermostats 75 and 120 also include a commutator arrangement including fixed rings, and brush assemblies which are rotatable with the transformer.

Figure 4:
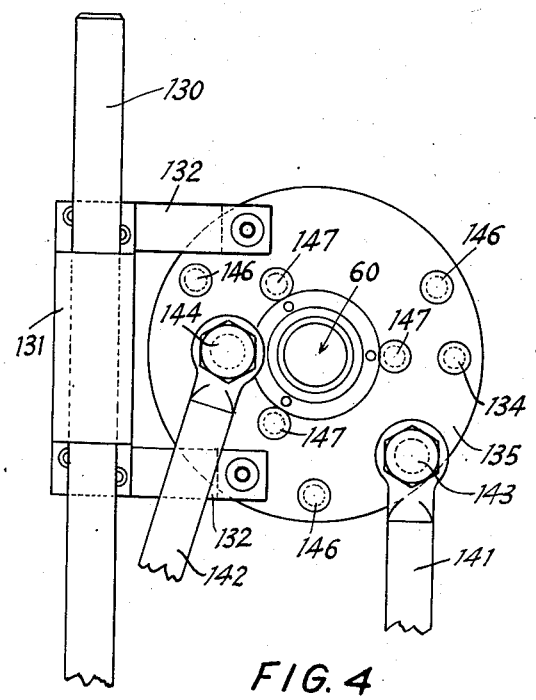
Figure 3:
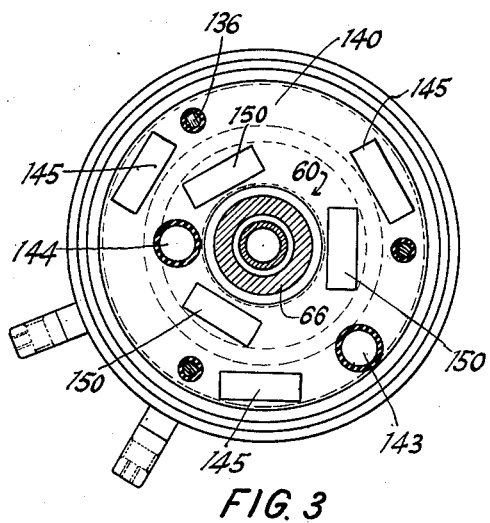

The stationary part of each commutator assembly is supported upon a vertical post 130 which is precisely positioned so as to be in exact alignment with the vertical movement of the transformer assembly. Referring to Fig. 4, post 130 slidably supports a sleeve bracket 131 which has spaced arms 132 secured at their outer ends to an annular insulating plate 135 embracing an insulating sleeve 133 on member 66. Plate 135 supports the brush assembly by means of bolts 134 extending through insulating sleeves 136 and connected to the outer brush ring 137. Brush ring 137, as well as an inner brush ring 138 concentric therewith, are supported within an insulated holder 140, with the inner brush ring 138 embracing sleeve 133. Current is conducted from a suitable source through conductors 141 and 142 secured to terminals 143 and 144, respectively, these terminals being mounted through plate 135 and having their inner ends conductively secured in rings 137 and 138 respectively.

Outer brush ring 137 supports three (3) brushes 145 which are spring biased inwardly by brush spring assemblies 146. Similarly, ring 138 supports three (3) brushes 150 which are spring biased inwardly by brush spring assemblies 147. Holder 140 carries a pair of rings 148 on its external periphery.

Brushes 145 and 150 conductively engage commutator rings 155 and 160, respectively, which are mounted in a ring holder 151 of insulating material. This holder is secured to rotate with the transformer assembly, being mounted on the inner end of manifold member 66. The four (4) primary winding sections are connected in series with each other. For this purpose, a terminal 156 is connected to ring 155 and has a connector 157 leading to one end of the first primary winding section, being electrically connected through the coolant inlet thereto. The other end of the first primary winding section is connected to the adjacent end of the next primary winding section by a conductor 158 leading from the coolant outlet of one section to the coolant inlet of the other section.

Similarly, conductors 159, 159 connect the other sections in series to the first two (2) sections. The end of the last section adjacent the leading end of the first section is connected by a conductor 161 to a terminal 162 secured to the ring 160. Thereby, the current flows from leader conductor 141 through the brush and ring arrangement to one end of the primary winding, and from the other end thereof, through the other commutator ring and its brushes to the lead or conductor 142.

To prevent coolant entering and affecting the brush and ring assembly, a deflector is disposed in embracing relation with such assembly separating the latter from the coolant connections. The deflector assembly includes brackets 165 secured to holder 151 and supporting shield 118 in substantially parallel relation to post 130. The deflector assembly supports the primary manifold arrangement by means of suitable clamps and bolts.

Brackets 165 act as supports for an insulating holder 170 having brushes 171 engaging rings 148. Brushes 171 are connected in the control circuit for the thermostats 75 and 120, and the control circuit connection to the cooling control means is effected through the brush and ring assembly 148, 171 through suitable conductors (not shown).

With the described arrangement, a relatively high voltage is applied through the brush and ring assembly to the primary winding and electrical energy is inductively transferred to the single turn secondary winding comprising the casing sections 27, 28 and their tubular extensions 36, 37. The welding circuit is completed through the electrodes 15 and 20 each secured to a different tubular extension. As stated, these electrodes can be firmly seated on the transformer by virtue of the tapered seat mounting and the nut 52. The coolant flow through the inlet manifold is distributed to the primary winding coils in parallel, to the tubular members 36, 37, and through the casing sections 27, 28. Distribution to the primary winding is effected through the manifolds 116 and 124. The thermostats 75 and 120, are connected in series with each other to control the return of coolant flow through the transformer assembly in accordance with varying temperature conditions.

While a specific embodiment of the invention has been shown and described in detail to illustrate the application of the invention principles, it will be understood that the invention may be embodied otherwise without departing from such principles.

I claim:

1. In electric seam welding apparatus a welding circuit including a pair of concentric, substantially telescoped, electrically conductive cylindrical members secured together as a unit in insulated relation to each other; the inner member having a radial extension axially beyond one end of the outer member; said one end of the outer member having a frusto-conical surface forming a seat, tapering toward the outer end of the outer member, for a circular electrode arranged to engage one edge of the longitudinal seam to be welded; said extension having a frusto-conical surface forming a seat, tapering toward the outer end of the outer member, for a second electrode arranged to engage the other edge of the seam to be welded; means insulating said electrodes from each other; the two frusto-conical surfaces being part of the same conical surface of revolution; means engaging the second electrode and operative to force both electrodes inwardly along said tapered seats to fit tightly thereon; bearing means supporting said members for rotation; and means connecting said members to a source of electric potential.

2. In electric seam welding apparatus, a welding circuit including a pair of concentric, substantially telescoped, elongated, electrically conductive cylindrical members secured together as a unit in insulated relation to each other and each having coolant passages therein; the inner member having a radial extension axially beyond one end of the outer member and formed with means establishing communication between the coolant passages in said members; said extension being secured against rotation relative to said inner member; said one end of the outer member having a frusto-conical surface forming a seat, tapering toward the outer end of the outer member, for a circular electrode arranged to engage one edge of the longitudinal seam to be welded; said extension having a frusto-conical surface forming a seat, tapering toward the outer end of the outer member, for a second electrode arranged to engage the other edge of the seam to be welded; the two frusto-conical surfaces being part of the same conical surface of revolution; means insulating said electrodes from each other; means mounted for axial movement along said extension and engaging the outer surface of the second electrode and operative to force both electrodes inwardly along said tapered seats to fit tightly thereon; bearing means supporting said members for rotation; and means connecting the inner ends of said members to a source of electric potential.

3. In electric seam welding apparatus, a welding circuit including a pair of concentric, substantially telescoped, elongated, electrically conductive cylindrical members secured together as a unit in insulated relation to each other; the inner member having a radial extension secured thereto axially beyond one end of the outer member; said one end of the outer member being provided with a frusto-conical surface forming a seat, tapering toward the outer end of the outer member, for a circular electrode arranged to engage one edge of the longitudinal seam to be welded; said extension having a frusto-conical surface forming a seat, tapering toward the outer end of the outer member, for a second electrode arranged to engage the other edge of the seam to be welded; the two frusto-conical surfaces being part of the same conical surface of revolution; means insulating said electrodes from each other; means engaging the second electrode and operative to force both electrodes inwardly along said tapered seats to fit tightly thereon; bearing means supporting said members for rotation; and means connecting the inner ends of said members to a source of electric potential.

4. In electric seam welding apparatus, a welding transformer including a secondary winding having its terminals formed as concentric, axially adjacent frusto-conical elements having their conical surfaces formed as part of a single conical surface of revolution to provide tapered electrode seats; means insulating said elements from each other; an electrode unit comprising a pair of rotary electrodes secured together in concentric relation and insulated from each other, each electrode having a frusto-conical seating surface engageable with one of said electrode seats, the electrode seating surfaces forming part of the same conical surface of revolution; means operable to force said unit inwardly along said electrode seats to fit tightly thereon.

5. In electric seam welding apparatus, a welding transformer including a secondary winding having its terminals formed as concentric, axially adjacent frusto-conical elements having their conical surfaces formed as part of a single conical surface of revolution to provide tapered electrode seats; means insulating said elements from each other; an electrode unit comprising a pair of rotary electrodes and an insulating disk secured together concentrically as a unit with the disk interposed between the electrodes, each electrode having a frusto-conical seating surface engageable with one of said electrode seats, the electrode seating surfaces forming part of the same conical surfaces of revolution; means operable to force said unit inwardly along said electrode seats to fit tightly thereon.

ERNST W. ALLARDT.

References Cited in the file of this patent
UNITED STATES PATENTS

| Number | Name | Date |
|---|---|---|
| 1,811,886 | Hunter | June 30, 1931 |
| 2,284,315 | Yoder | May 26, 1942 |